United States Patent [19]

Maruyama

[11] Patent Number: 5,087,990

[45] Date of Patent: Feb. 11, 1992

[54] COLLIMATOR LENS OF ERASABLE AND RE-RECORDABLE MAGNETO-OPTICAL DISK SYSTEM

[75] Inventor: Koichi Maruyama, Tokyo, Japan

[73] Assignee: Asahi Kogaku Kogyo Kabushiki Kaisha, Tokyo, Japan

[21] Appl. No.: 535,485

[22] Filed: Jun. 11, 1990

[30] Foreign Application Priority Data

Jun. 13, 1989 [JP] Japan ................... 1-150172

[51] Int. Cl.$^5$ .................................. G02B 9/06
[52] U.S. Cl. .................................. 359/794
[58] Field of Search .................... 350/479, 480

[56] References Cited

U.S. PATENT DOCUMENTS 2,405,301 8/1946 Gray .................... 350/480

FOREIGN PATENT DOCUMENTS

Z4700IX 2/1956 Fed. Rep. of Germany ...... 350/480
62-245212 10/1987 Japan .

Primary Examiner—Scott J. Sugarman
Attorney, Agent, or Firm—Sandler, Greenblum & Bernstein

[57] ABSTRACT

A collimator lens for an erasable and re-recordable magneto-optical disk system comprising a first positive lens, a second positive lens and a third negative lens arranged from a light outgoing side in order. The second and third lenses are cemented together and the cemented lens has a positive power. A refractive index of the first lens n1 is lower than 1.686.

3 Claims, 4 Drawing Sheets

COLLIMATOR LENS OF ERASABLE AND RE-RECORDABLE MAGNETO-OPTICAL DISK SYSTEM

BACKGROUND OF THE INVENTION

1. Field of the Invention

This invention relates a collimator lens which is used in an erasable and re-recordable magneto-optical disk system.

2. Description of the Prior Art

The collimator lens of the erasable and re-recordable magneto-optical disk system has a large numerical aperture in order to effectively use divergent light emitted from a light source. The collimator lens is required to provide a short distance from the light source to an outgoing surface of the collimator lens in order to enable a design for making a whole optical system compact.

Japanese Laid Open Publication No. Sho 62-245212 discloses a lens which is designed under the aforementioned object.

The lens mentioned in this publication is a two group three piece construction having a first group which consists of a positive lens and second group which consists of a cemented lens of positive and negative lenses. Furthermore, the first lens group is formed of high refractive index glass material in order to abate the generation of spherical aberration therein.

Though aforementioned prior art collimator lens can be compact in construction, it does not sufficiently correct a chromatic aberration.

The optical system of the erasable and re-recordable magneto-optical disk system includes a light source, a collimator lens for collimating the divergent luminous flux, and an objective lens for converging the light beam onto the recording surface of the optical disk. The objective lens is mounted on an actuator designed such that the objective lens can be finely moved at least in the optical axis direction so that defocusing caused by warping of the disk, etc. can be corrected.

If the collimator lens has a chromatic aberration, when a light source, where the wavelength changes due to change of output, temperature, or the like, is used, even if the aforementioned autofocus mechanism acts normally, the light converging position is not coincident with the recording surface of the disk.

The amount of out of focus P indicated as a following equation;

$$P=(m^2 \cdot \delta)/2$$

In this equation, m denotes imaging magnification of an image of the light source which is formed by the collimator lens and the objective lens, and $\delta$ denotes a chromatic aberration on an axis of the collimator lens.

As mentioned above, when the optical system is used for recording, it is necessary that a numerical aperture NA of the collimator lens be larger in order to utilize energy of a light beam from the light source. Therefore, as the magnification m of the collimator lens grows larger, out of focus is generated by the chromatic aberration.

SUMMARY OF THE INVENTION

The present invention has been accomplished in order to solve the above-mentioned problems. An object of the present invention is to supply a collimator lens for an erasable and re-recordable magneto-optical disk system which is short in total length, has a large numerical aperture and is corrected in chromatic aberration.

DETAILED DESCRIPTION OF THE EMBODIMENTS

Figure 1:
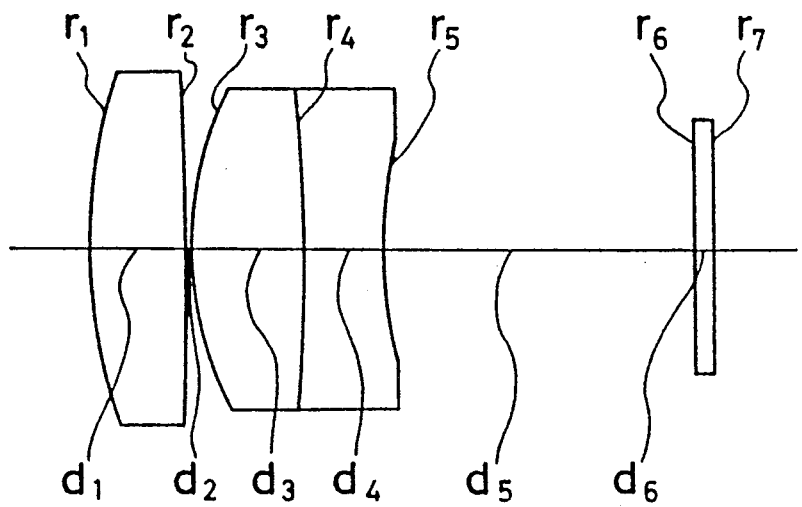
FIG. 1 is a lens diagram showing a first embodiment of a collimator lens.

The embodiment of the present invention will be described hereinafter with reference to the drawings.

A collimator lens of this invention is comprised of a positive first lens having a small radius convex surface for a light outgoing side, a positive second lens having a small radius convex surface for the outgoing side and a negative third lens having a small radius concave surface in a light incident side, arranged from a light outgoing side in order. The second lens and the third lens are cemented together, and the cemented lens has a positive power.

Also, the collimator lens shown in the following examples satisfy the following relations;

$$n1 < 1.686 \quad (1)$$

$$(n3 - n2) > 0.20 \quad (2)$$

$$-0.55 < f/r4 < -0.15 \quad (3)$$

$$(\nu 3 - \nu 2) > 28 \quad (4)$$

The symbolic characters used in the above relations have the following meanings.

n1: refractive index of the first lens
n2: refractive index of the second lens
n3: refractive index of the third lens
f: focal length of whole collimator lens
r4: radius of curvature of the cemented surface
$\nu 2$: Abbe number of the second lens
$\nu 3$: Abbe number of the third lens The first lens acts as a condenser lens which restrains generation of the spherical aberration, and the spherical aberration of the whole system can be restrained when the spherical aberration of this lens is small.

When only an abatement of the spherical aberration is considered, a high refractive index of the material of the first lens is demanded. However, a change of the spherical aberration according to the change of the refractive index is can be corrected by the cemented surface of the second and third lenses. Therefore, it is necessary to select the glass material of the first lens considering correction of chromatic aberration and a productivity of the lens.

If the reference character n1 denotes a refractive index of the first lens, the first lens should be formed as a meniscus lens when the condition n1>1.686 is satisfied so that a value of spherical aberration of the first lens is minimum. In the same manner, the first lens should be formed as a convex plane lens when the condition n1=1.686 is satisfied, and should be formed as a double convex lens when the condition n1<1.686 is satisfied.

Since the first lenses of the lens systems disclosed in Japanese Laid Open Publication No. Sho 62-245212 satisfy the condition n1>1.686 in any embodiments, all of the first lenses are formed as meniscus positive lenses. Alternatively, if relation (1) is satisfied, the first lens can be made of a double convex lens, or a plane convex lens.

When these three types of the lens are compared with each other from the view point of lens processing, the plane convex lens is the easiest to process, and a centering process of the double convex lens is easier than the same type of process of the meniscus lens.

Also, when the lens is assembled in a lens barrel, the abutting surfaces of the double convex lens and the plane convex lens are polished surfaces in order to accurately set the distance between lenses. However, when the meniscus lens is assembled in the lens barrel, as it is difficult to abut on the lens barrel the polished surface, it is necessary that an edge portion of the lens be grainded in order to accurately set the lens.

Furthermore, when the refractive index of the first lens is under 1.686, it is possible to use a low dispersion glass material and consequently correcting amount for chromatic aberration of the second and third lens is reduced, and it is possible to raise a total mass productivity.

In order to correct the spherical aberration generated in the first lens, it is necessary that the refractive index of the third lens be higher than the same of the second lens as shown in the relation (2). When condition (2) is not satisfied, the radius of curvature of the cemented surface is too small to correct the spherical aberration.

The relation (3) shows a condition for giving a suitable effect to correct the spherical aberration to the cemented surface. If f/r4 is lower than −0.55, although it is easy to correct a cubical spherical aberration, a high order spherical aberration still exist. For that reason, when the spherical aberration is full corrected, a bulge of the spherical aberration in the medium range becomes large, and it is impossible to enlarge the numerical aperture NA. Otherwise, if f/r4 is higher than −0.15, a correction of spherical aberration would not be enough.

Relation (4) shows the condition to correct a chromatic aberration. If the condition is not satisfied, a correction of the chromatic aberration is sufficiently obtained enough when f/r4<−0.55 is satisfied and the refractive power of the second and third lenses are large. However, when the lens is designed according to this construction, it is impossible to restrain the generation of high order spherical aberration.

It is desirable that the first lens be formed as a plane-convex lens. When a plane-convex lens is used as a first lens, the spherical aberration is minimized when the refractive index of the first lens n1 is in the vicinity of 1.686.

FIG. 1 shows a first embodiment of a collimator lens according to the present invention. This lens comprise a first, second and third lenses which are arranged in order from the light outgoing side(left side in the FIG. 1). The second and third lens are cemented with each other.

Figure 2:
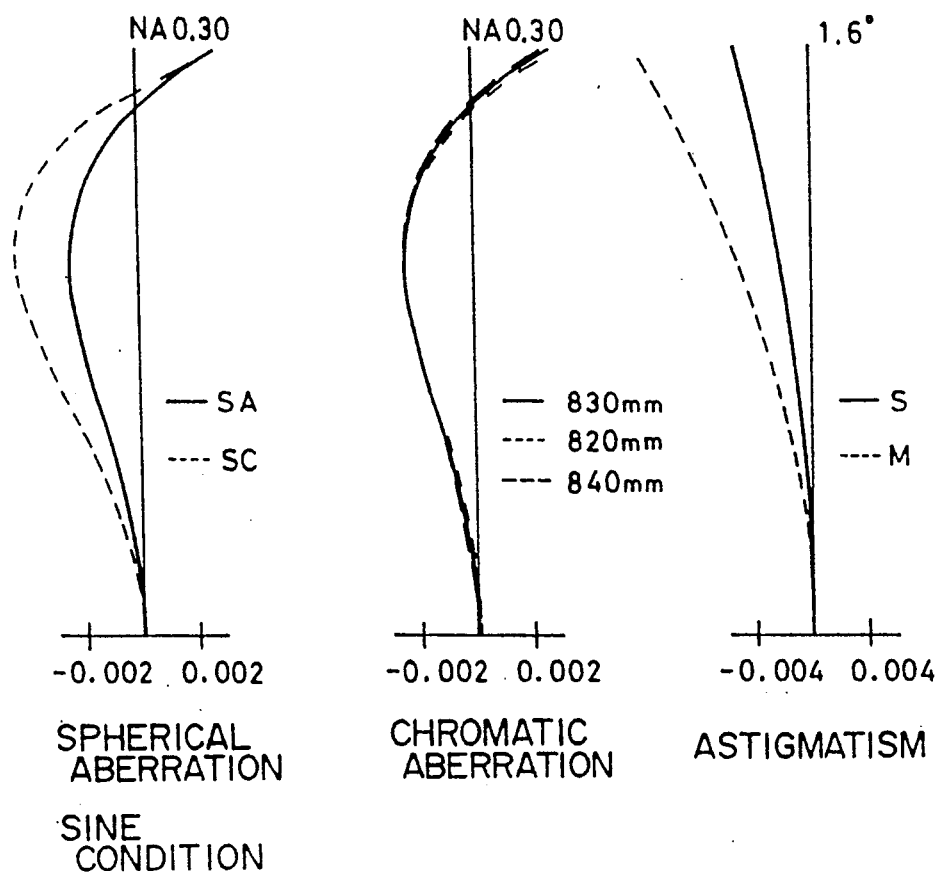
FIG. 2 are various aberration diagrams of the collimator lens shown in FIG. 1.

Concrete numerical constructions are shown in Table 1 and Table 2. In the tables, the reference character FNO. denotes a f-number, f denotes a focal length of the objective lens system in a wavelength of 588 nm, $\omega$ denotes a half field angle, r denotes the radius of curvature of a surface, d denotes a lens thickness or a spatial distance, n denotes a refractive index in a wavelength of 588 nm, and $n(\lambda)$ denotes a refractive index in a wavelength $\lambda$. The sixth and seventh surfaces denote the cover glass. Various aberrations of this collimator lens are shown in FIG. 2.

TABLE 1

| surface No. | r | d | n | $\nu$ | n(830) |
|---|---|---|---|---|---|
| 1 | 5.926 | 1.230 | 1.56907 | 71.3 | 1.56283 |
| 2 | −52.126 | 0.050 | | | |
| 3 | 3.867 | 1.400 | 1.56907 | 71.3 | 1.56283 |
| 4 | −18.088 | 1.000 | 1.84666 | 23.8 | 1.82154 |
| 5 | 5.551 | 3.897 | | | |
| 6 | ∞ | 0.250 | 1.51633 | 64.1 | 1.50974 |
| 7 | ∞ | | | | | conditions
(1) n1 = 1.56283  (2) n3 − n2 = 0.2587
(3) f/r4 = −0.387  (4) $\nu$3 − $\nu$2 = 47.5

Figure 3:
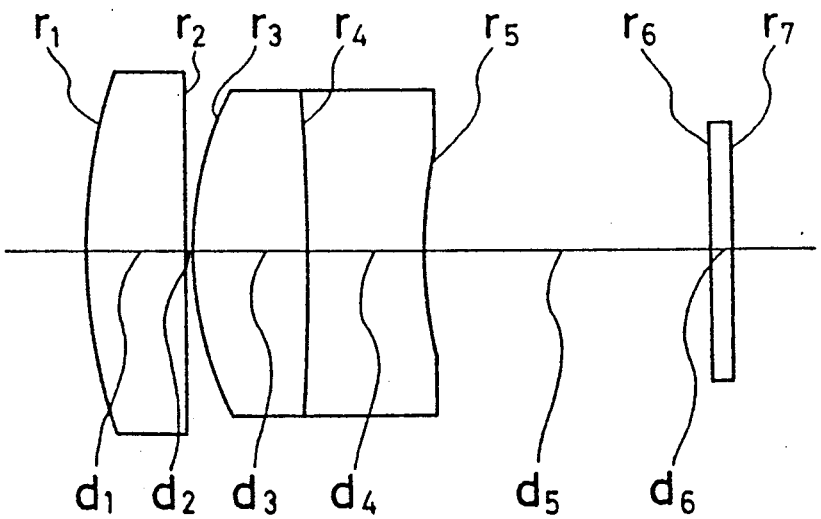
FIG. 3 is a lens diagram showing a second embodiment of a collimator lens.
Figure 4:
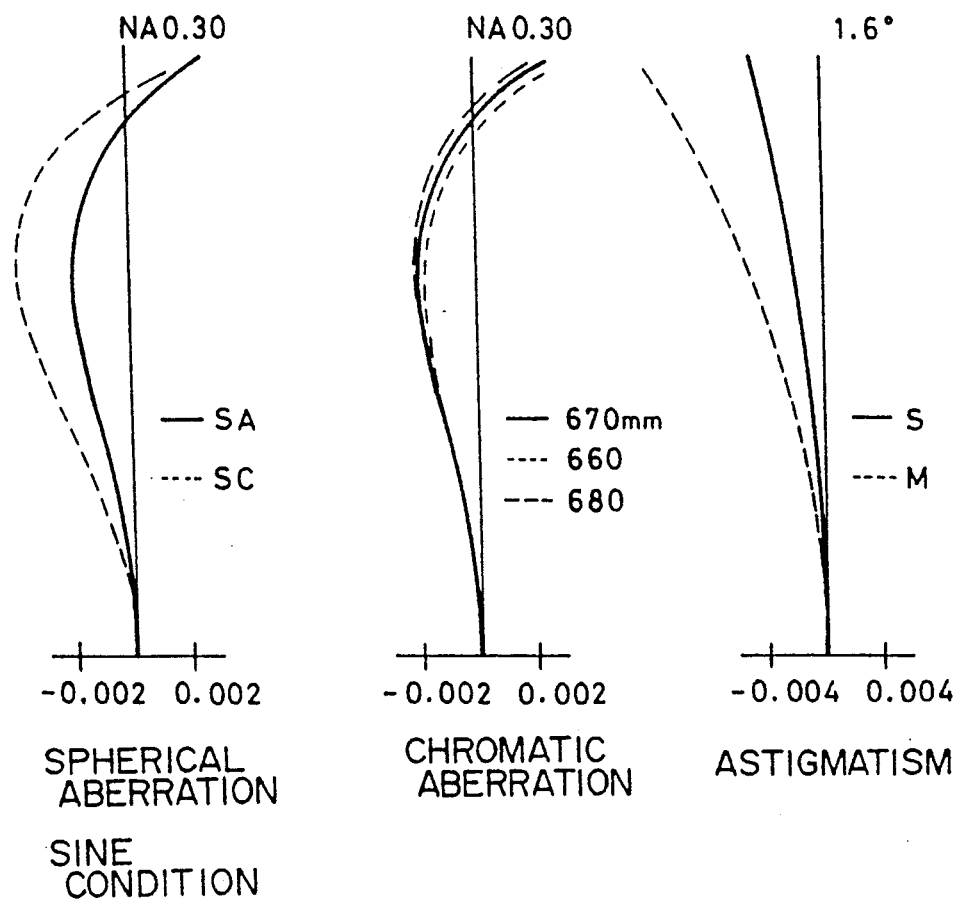
FIG. 4 are various aberration diagrams of the collimator lens shown in FIG. 3.

FIG. 3 shows a second embodiment of the collimator lens and concrete numerical value construction is shown in TABLE 2. Various aberrations of this collimator lens are shown in FIG. 4.

TABLE 2

| surface No. | r | d | n(d) | $\nu$ | n(670) |
|---|---|---|---|---|---|
| 1 | 6.000 | 1.230 | 1.61800 | 63.4 | 1.61455 |
| 2 | −105.190 | 0.070 | | | |
| 3 | 3.894 | 1.400 | 1.56907 | 71.3 | 1.56626 |
| 4 | −21.700 | 1.400 | 1.84666 | 23.8 | 1.83486 |
| 5 | 4.875 | 3.493 | | | |
| 6 | ∞ | 0.250 | 1.51633 | 64.1 | 1.51344 |
| 7 | ∞ | | | | | conditions:
(1) n1 = 1.61455  (2) n3 − n2 = 0.2686
(3) f/r4 = −0.323  (4) $\nu$3 − $\nu$2 = 47.5

Figure 5:
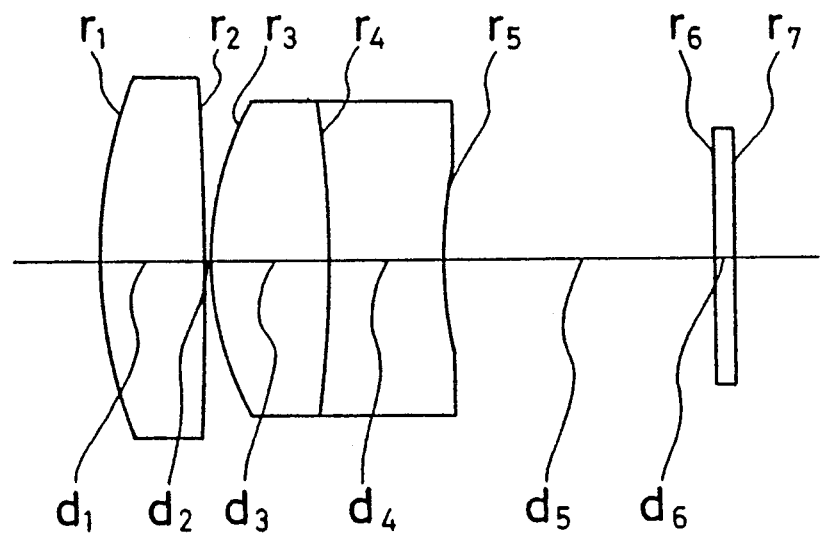
FIG. 5 is a lens diagram showing a third embodiment of a collimator lens.
Figure 6:
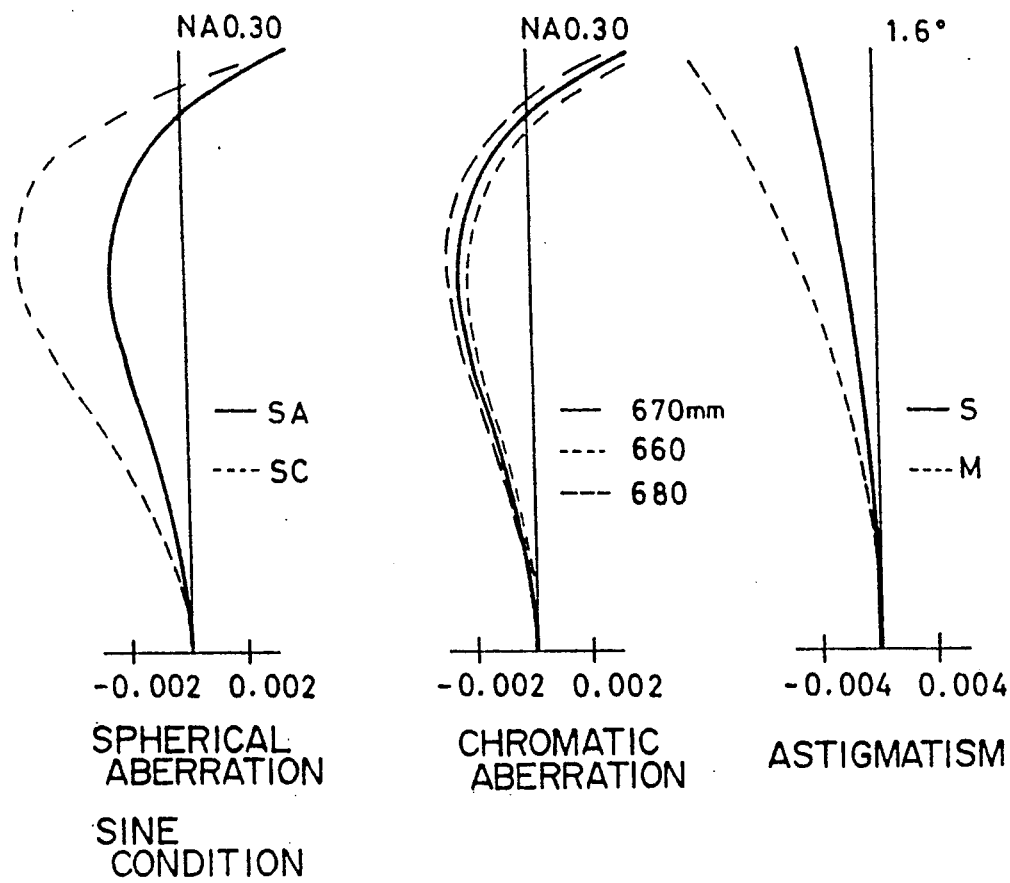
FIG. 6 are various aberration diagrams of the collimator lens shown in FIG. 5.

FIG. 5 shows a third embodiment of the collimator lens and concrete numerical value construction is shown in TABLE 3. Various aberrations of this collimator lens are shown in FIG. 6.

TABLE 3

| surface No. | r | d | n(d) | $\nu$ | n(670) |
|---|---|---|---|---|---|
| 1 | 5.302 | 1.300 | 1.56907 | 71.3 | 1.56626 |
| 2 | −39.613 | 0.080 | | | |
| 3 | 3.617 | 1.400 | 1.51633 | 64.1 | 1.51344 |
| 4 | −14.206 | 1.400 | 1.84666 | 23.8 | 1.83486 |
| 5 | 4.604 | 3.300 | | | |
| 6 | ∞ | 0.250 | 1.51633 | 64.1 | 1.51344 |
| 7 | ∞ | | | | | condition
(1) n1 = 1.56907  (2) n3 − n2 = 0.3214
(3) f/r4 = −0.493  (4) $\nu$3 − $\nu$2 = 30.3

Figure 7:
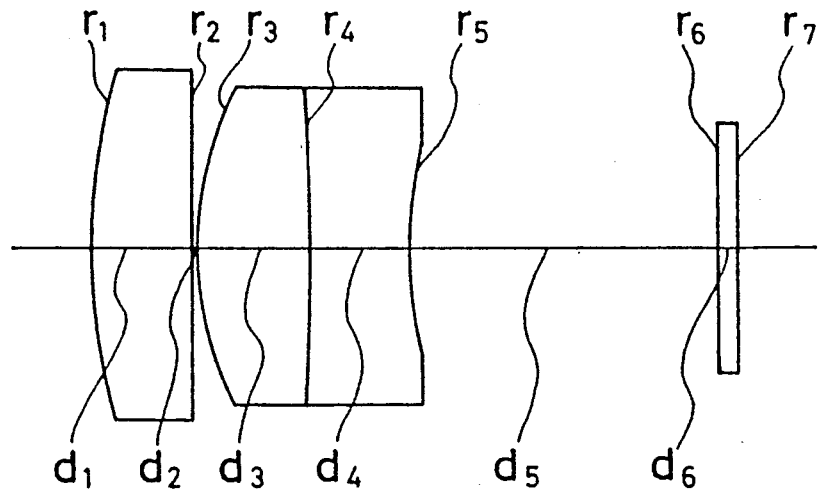
FIG. 7 is a lens diagram showing a fourth embodiment of a collimator lens.
Figure 8:
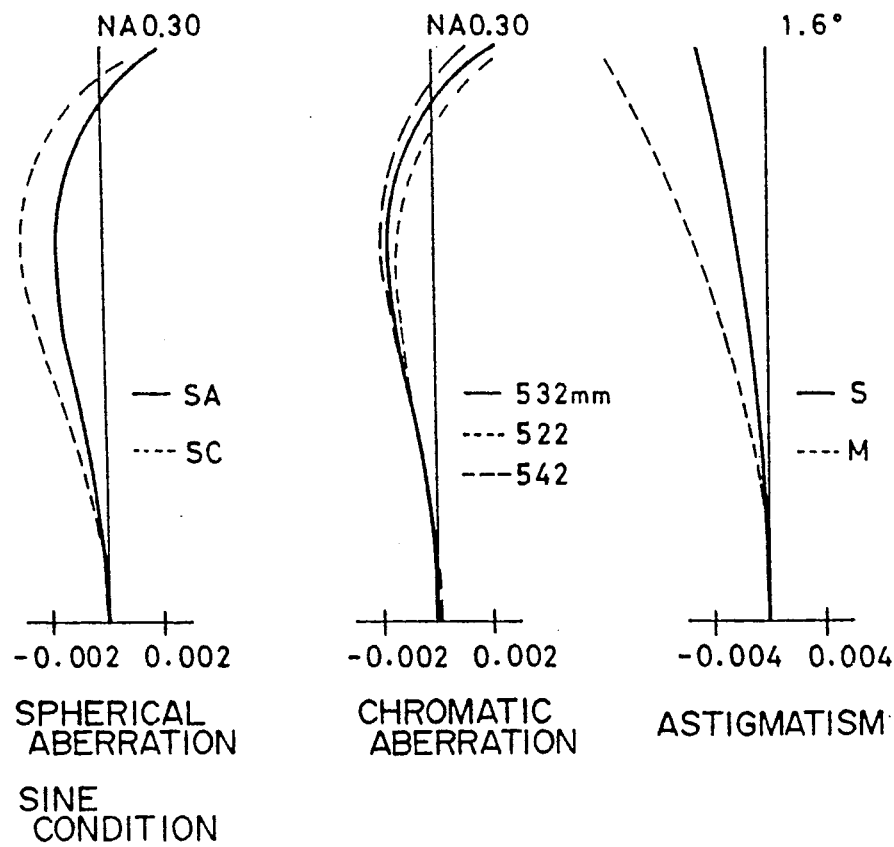
FIG. 8 are various aberration diagrams of the collimator lens shown in FIG. 7.

FIG. 7 shows a forth embodiment of the collimator lens and concrete numerical value construction is shown in TABLE 4. Various aberrations of this collimator lens are shown in FIG. 8.

TABLE 4

FNO. = 1:1.7 f = 7.01 ω = 1.6°

| surface No. | r | d | n(d) | ν | n(532) |
|---|---|---|---|---|---|
| 1 | 6.700 | 1.300 | 1.61800 | 63.4 | 1.62124 |
| 2 | ∞ | 0.070 | | | |
| 3 | 4.080 | 1.400 | 1.56907 | 71.3 | 1.57172 |
| 4 | −38.421 | 1.300 | 1.84666 | 23.8 | 1.85842 |
| 5 | 6.667 | 3.836 | | | |
| 6 | ∞ | 0.250 | 1.51633 | 64.1 | 1.51900 |
| 7 | ∞ | | | | | condition (1) n1 = 1.62124   (2) n3 − n2 = 0.2867
(3) f/r4 = −0.182   (4) ν3 − ν2 = 47.5

What is claimed is:

1. A collimator lens for an erasable and re-recordable magneto-optical disk system comprising:

a positive first lens having a convex light emergent, surface and a light incident surface, wherein said light incident surface has a greater radius of curvature than the radius of curvature of said convex light emergent surface, a positive cemented lens having
   a positive second lens having a convex light emergent surface and a light incident surface, wherein said light incident surface has a greater radius of curvature than the radius of curvature of said convex light emergent surface, and a negative third lens having a light emergent surface and a concave light incident surface, wherein said light emergent surface has a greater radius of curvature than the radius of curvature of said concave light incident surface, wherein said lenses are arranged from a light emergent side in order, and said collimator lens satisfies a relation as follows:

$$n1 < 1.686$$

where
   n1: refractive index of the first lens.

2. A collimator lens for an erasable and re-recordable magneto-optical disk system according to claim 1, wherein the following relations are satisfied:

$$(n3 - n2) > 0.20$$

$$-0.55 < f/r4 < -0.15$$

$$(\nu 3 - \nu 2) > 28$$

where
   n2: refractive index of said second lens
   n3: refractive index of said third lens
   f: focal length of said collimator lens
   r4: radius of curvature of a cemented surface
   ν2: Abbe number of said second lens
   ν3: Abbe number of said third lens.

3. A collimator lens for an erasable and re-recordable magneto-optical disk system according to claim 1, wherein said first lens is formed as a plane-convex lens.

* * * * *